United States Patent [19]
Alferness et al.

[11] Patent Number: 4,883,335
[45] Date of Patent: Nov. 28, 1989

[54] SINGLE-MODE OPTICAL FIBER TAP

[75] Inventors: Rodney C. Alferness, Holmdel; Thomas H. Wood, Highlands, both of N.J.

[73] Assignees: American Telephone and Telegraph Company, New York, N.Y.; AT&T Bell Laboratories, Murray Hill, N.J.

[21] Appl. No.: 144,777

[22] Filed: Jan. 20, 1988

Related U.S. Application Data

[63] Continuation of Ser. No. 816,437, Jan. 6, 1986, abandoned.

[51] Int. Cl.$^4$ ................................................ G02B 6/26
[52] U.S. Cl. ............................. 350/96.15; 350/96.16; 350/96.29
[58] Field of Search ................ 350/96.15, 96.16, 96.29

[56] References Cited

U.S. PATENT DOCUMENTS 4,674,830  6/1987  Shaw et al. ..................... 350/96.15
4,723,824  2/1988  Shaw et al. ..................... 350/96.15

FOREIGN PATENT DOCUMENTS 0143561  6/1985  European Pat. Off. ......... 350/96.15

OTHER PUBLICATIONS

Apply Phys. let. 45(5), Sep. 1, 1984, "Integrated-Optical Frequency Translator etc." F. Heismann et al., pp. 490-492.
"Integrated Optics for Fibre Communications Systems", Optical Fibre Comm., 16-18 Sep. 1975, Ash et al, pp. 131-134.
Jour. Lightwave Tech. vol. LT-3, No. 3, Jun. 1985, "Increased Power Injection etc." T. H. Wood, pp. 537-543.
Elec. Lett., vol. 21, No. 17, Aug. 15, 1985, "Directional-Coupler Filter etc." D. Marcuse, pp. 726-727.
Elec. Lett., vol. 21, No. 17, Aug. 15, 1985, "Fabrication of Low-Loss Optical etc." S. B. Poole et al, pp. 737-738.
Elec. Lett, vol. 21, No. 17, Aug. 15, 1985, "Neodymium-Doped Silica Single-Mode etc." R. J. Mears et al, pp. 738-740.
Elec. Lett, vol. 21, No. 17, Aug. 15, 1985, "In-Line Optical-Fibre Filter etc." M. S. Whelan et al, pp. 724-725.

Primary Examiner—John D. Lee
Assistant Examiner—John Ngo
Attorney, Agent, or Firm—Samuel H. Dworetsky

[57] ABSTRACT

An optical power tap is disclosed which allows effectively nonreciprocal injection and removal of power at each node of a single-mode optical fiber local area network. The power tap uses a wavelength-selective directional coupler to inject and remove power from the bus, and a nonlinear converter in the bus to convert light from one wavelength to another. In the specific embodiment disclosed a neodymium-doped silica fiber is used as a nonlinear material to convert light from one wavelength to another.

8 Claims, 3 Drawing Sheets

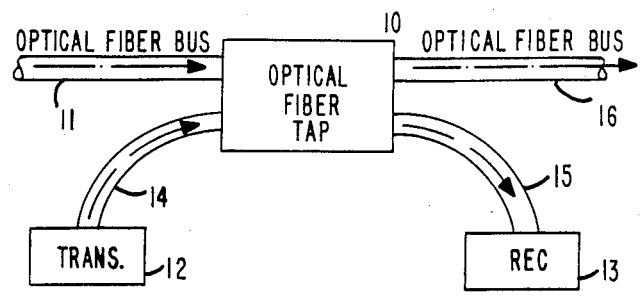
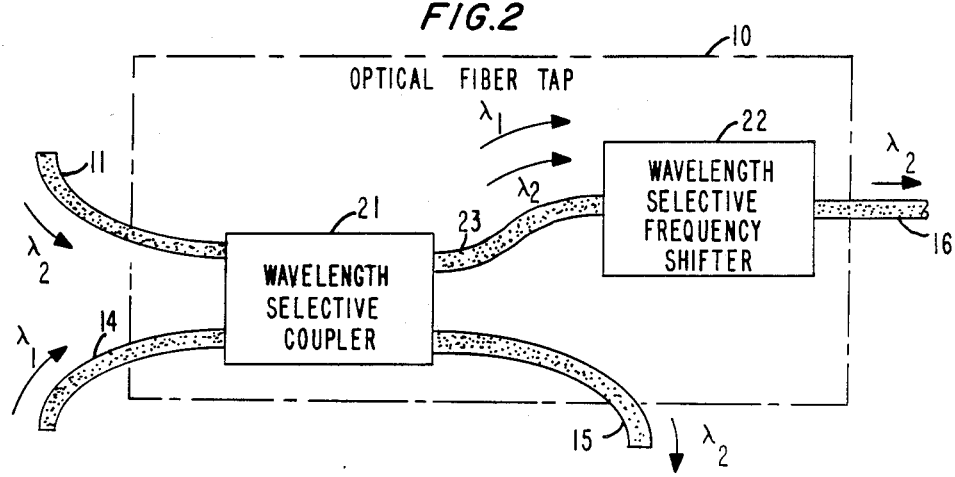
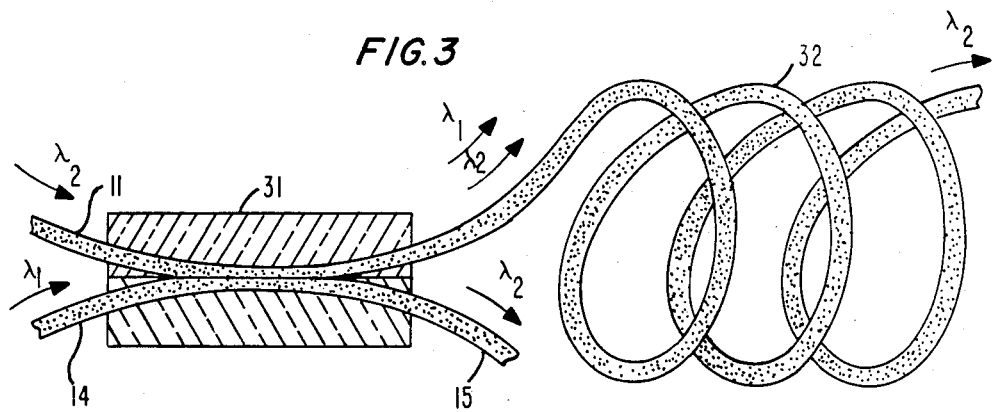

NORMALIZED POWER OUT VERSUS POWER IN

SINGLE-MODE OPTICAL FIBER TAP

This application is a continuation of application Ser. No. 816,436, filed Jan. 6, 1986 (now abandoned).

BACKGROUND OF THE INVENTION

In an optical fiber Local Area Network (LAN), a major figure of merit is the total number of stations that can be put on the network without an active repeater. In most cases, this is limited by the requirement that sufficient optical power be delivered from each transmitter to each receiver on the bus. In an LAN of the type considered, a transmitter 12 and receiver 13 are connected to an optical fiber bus 11 by way of an optical fiber tap 10 as indicated in FIG. 1 of the drawings. In order to couple the power from each transmitter to all of the receivers in the LAN, it is desirable to have each transmitter couple into the bus with unity efficiency and each receiver couple to the bus with a coupling efficiency of order 1/N, where N is the number of stations on the bus. Unfortunately, the principle of reciprocity forbids this, since it demands these two coupling coefficients be equal in passive couplers. This leads to very inefficient coupling, a large waste of optical power, and severe limitations on the number of stations that can be coupled to the bus.

It was recently proposed that this problem could be overcome in multimode optical fiber busses through the use of mode-selective coupling between a single-mode fiber and the multimode bus fiber. See the article entitled "Increased power injection in multimode optical fiber busses through mode-selective coupling," *IEEE Journal Lightwave Technology*, LT-3 537 (1985), by T. H. Wood. By coupling the single-mode optical fiber strongly to one or a few modes of the bus fiber, the light from the local transmitter can be efficiently coupled into the bus fiber. However, if the light traveling on the bus has its power uniformly distributed among the modes of the bus, this power will only be weakly tapped out. Calculations indicated that this approach can lead to an increase in injected power of about 7 dB, and an almost doubling of the number of possible stations on the bus. This coupling was experimentally demonstrated in a polished evanescent directional coupler between a 50 μm core multimode fiber and a standard AT&T 5D single-mode fiber. See the article entitled "Effectively nonreciprocal evanescent-wave optical-fiber directional coupler", *Electronic Letters*, 21, 175 (1985), by M. S. Whalen and T. H. Wood. An input coupling efficiency of −0.2 dB and an output coupling efficiency of −18 dB were demonstrated.

However, this approach described hereinabove, has the serious drawback that it is only applicable to multimode fiber busses. Future LANs may use single-mode fiber, where much higher bandwidths are possible.

SUMMARY OF THE INVENTION

An optical fiber tap is provided for a local area network or a fiber bus using a single mode optical fiber in accordance with the present invention by combining a wavelength selective coupler with a wavelength selective optical frequency shifter which in combination provide effectively non-reciprocal injection and removal of power at each node of the local area network. The wavelength selective coupler is designed to couple power from the transmitter at a first wavelength with maximum efficiency into the optical fiber bus and to couple power at a second wavelength from this bus into a receiver with much lower efficiency. The power at the output of the wavelength selective coupler from the transmitter is shifted in frequency to the second wavelength by the wavelength selective frequency shifter while leaving the second wavelength unchanged in frequency.

In the specific embodiment disclosed a wavelength selective coupler is combined with a neodymium-doped silica fiber which acts as a nonlinear material in converting light from a first wavelength to light at a second wavelength while leaving light at the second wavelength unchanged. Light at the output of the neodymium-doped fiber is only at the second wavelength and it may be coupled to the next wavelength selective coupler in the local area network.

BRIEF DESCRIPTION OF THE DRAWING

The invention will be more readily understood after reading the following detailed description in combination with the drawings, wherein FIG. 1 is a block diagram of a node in a local area network of the type which could utilize the present invention;

FIG. 2 is a block diagram of an optical fiber tap constructed in accordance with the present invention;

FIG. 3 is a more detailed diagram of an embodiment of the present invention which uses a neodymium-doped silica fiber as the wavelength selective frequency shifter.

DETAILED DESCRIPTION

Figure 4:
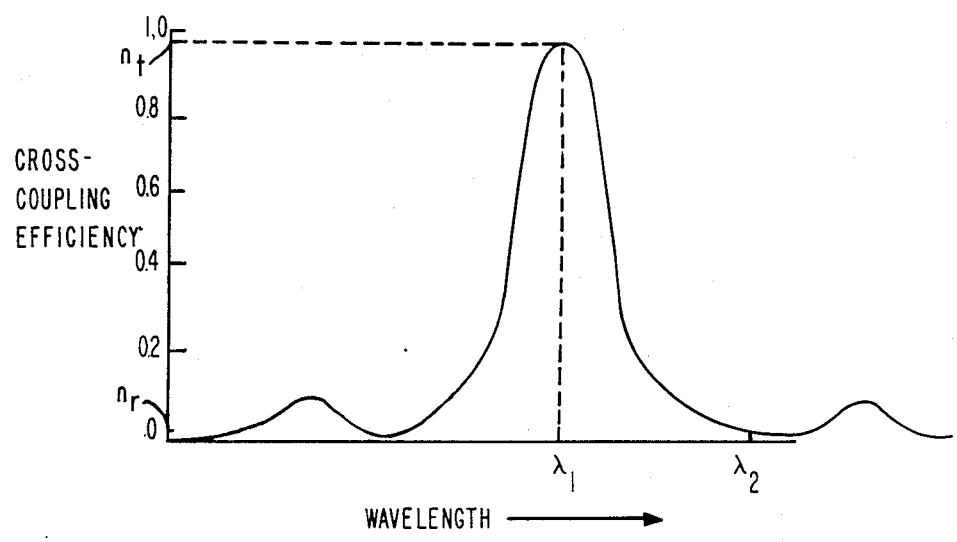
FIGS. 4 through 6 are curves and energy diagrams useful in describing the operation of the present invention.

An optical fiber tap that can be used in a single mode optical fiber system is shown in block diagram form in FIG. 2. The wavelength selective coupler 21 in FIG. 2 is connected to receive a light signal at wavelength $\lambda_2$ on an optical fiber bus 11 at one of its input ports and to receive a light signal at wavelength $\lambda_1$ from the transmitter by way of optical fiber 14 at a second input port. The wavelength selective coupler 21 is designed such that it has a strong coupling $n_t$ at a wavelength $\lambda_1$ and a weak, but nonzero, coupling $n_r$ at wavelength $\lambda_2$. Accordingly, the light at wavelength $\lambda_1$ from the transmitter will be strongly coupled through to the output port of wavelength selective coupler 21 that is connected to optical fiber 23, and the light at wavelength $\lambda_2$ on the optical fiber bus 11 will only be weakly coupled to a second output port of the wavelength selective coupler 21 that is connected by optical fiber 15 to the receiver. Optical fiber 23 carrying both the light at wavelength $\lambda_1$ and the remaining light at wavelength $\lambda_2$ is connected to a wavelength selective frequency shifter 22. This frequency shifter 22 is designed to have the property that it converts light at wavelength $\lambda_1$ to wavelength $\lambda_2$ efficiently but leaves the light at wavelength $\lambda_2$ unchanged.

The optical fiber tap of FIG. 2 provides effective nonreciprocal coupling of light into and out of the optical fiber bus. The light at wavelength $\lambda_1$ from the transmitter is coupled onto the bus through the wavelength selective coupler 21 with an efficiency $n_t$ which is close to unity. This light at wavelength $\lambda_1$ is then converted into light at wavelength $\lambda_2$ by the wavelength selective frequency shifter 22. As indicated hereinabove, any light at wavelength $\lambda_2$ passes through the frequency shifter 22 virtually unchanged and is therefore present to be coupled out to a local receiver at the next node. As a result, light from the transmitter on optical fiber 14 can be efficiently launched onto the optical fiber bus 23 and converted to wavelength $\lambda_2$ such that only a small fraction of it will be removed at each node in a local area network.

As indicated in FIG. 2, the optical fiber tap 10 need be constructed with only two components: a wavelength selective directional coupler and a wavelength selective frequency shifter. Various type devices can be used to implement both of these major functions in the optical fiber tap 10. One specific embodiment of the optical fiber tap is shown in FIG. 3.

In FIG. 3 the wavelength selective coupler 21 has been implemented by a polished directional coupler made from two dissimilar single mode fibers. Such a coupler can be found in the article entitled "In-line optical-fiber filter for wavelenth multiplexing," *Electronic Letters*, 21, 724 (1985) by M. S. Whalen and K. L. Walker. An analysis of this type coupler has been presented in the article entitled, "Directional-coupler filter using dissimilar optical fibres," *Electronic Letters*, 21, 726 (1985), by D. Marcuse. This analysis permits the designer to position the wavelength at which maximum coupling is desired and to shape the skirts of the coupling efficiently curve such that the desired low efficiency of cross-coupling can be achieved at the wavelength $\lambda_2$. A typical waveform of coupling efficiency versus wavelength for this type of directional coupler is shown in FIG. 4. As illustrated in FIG. 4 light at wavelength $\lambda_1$ is cross-coupled at an efficiency $n_t$ which is close to unity, whereas light at wavelength $\lambda_2$ is cross-coupled at a low efficiency close to but not equal to zero. In the system which is illustrated in FIG. 3, the coupler was designed to achieve maximum cross coupling at a wavelength of 0.8 microns and a low efficiency coupling at a wavelength $\lambda_2$ equal to 1.06 microns.

To provide the wavelength selective frequency shifting function in the embodiment of FIG. 3 a neodymium-doped silica single mode optical fiber 32 is shown. These neodymium-doped glasses have a strong absorption band at a wavelength equal to 0.8 micrometers and can be made to emit light at wavelengths equal to 1.066 micrometers. As indicated in the analysis which follows a sufficient amount of light at 0.8 micrometers can result in a high conversion efficiency of the photons at $\lambda_1$ to photons at $\lambda_2$.

Figure 5:
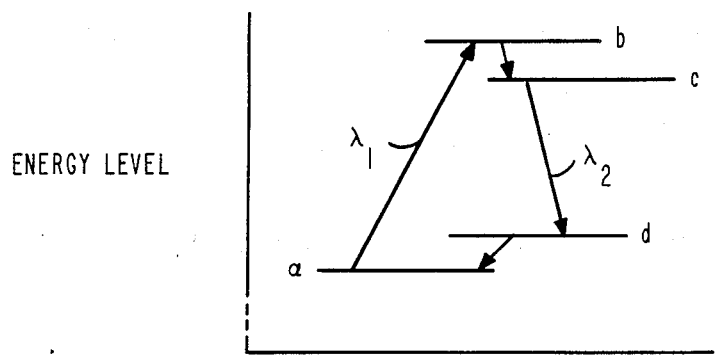
Figure 6:
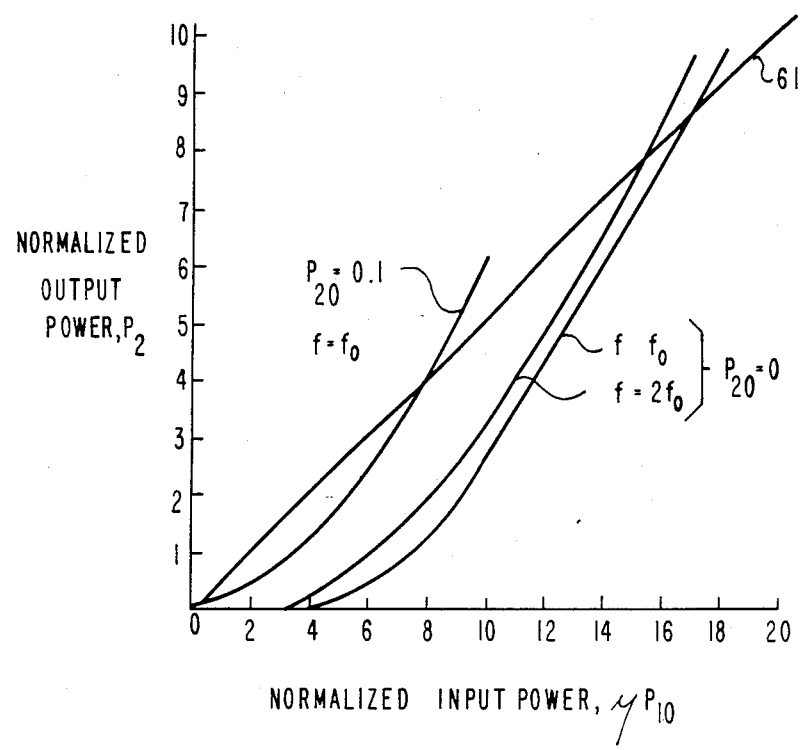

The energy level diagram for neodymium-doped silica is shown in FIG. 5. In FIG. 5 the levels a and b represent the absorption band at the wavelength $\lambda_1$ equal to 0.8 micrometers in that light at wavelength $\lambda_1$ will cause the neodymium-doped ions to change their state from energy level a to energy level b. These ions then undergo a nonradiative fast decay from level b to level c and then emit light when undergoing the transition from level c to level d. Finally, the ions undergo a fast nonradiative decay from level d to level a. These nonradiative decays occur on a time scale much faster than the other two processes considered herein.

If $I_1(x)$ represents the photon flux at a position x in the fiber at wavelength $\lambda_1$, and $I_2(x)$ represents the photon flux at a position x in the fiber at a wavelength $\lambda_2$, expressions for the photon flux and for the population of the excited ions, $N(x)$, at level c can be written. Assuming that the pump transition is not saturated and therefore that the population at level a, $N_o$, is not significantly changed by the conversion process, the equations can be represented as follows:

$$I_1(x) = I_{10}\exp(-N_0\alpha_1 x) \qquad (1)$$

$$\frac{dI_2}{dx} = \alpha_2 N(x) I_2(x) + \frac{fN(x)}{\tau_2} \qquad (2)$$

$$\frac{dN}{dt} = 0 = \eta N_0 \alpha_1 I_1(x) - \alpha_2 N(x) I_2(x) - \frac{N(x)}{\tau_2} \qquad (3)$$

where $\alpha_1$ and $\alpha_2$ are the small-signal absorption coefficients for the pump and lasing transitions respectively, $\tau_2$ is the spontaneous emission time for level c, N is the quantum efficiency of the pump transition, $I_{10}$ is the photon flux at $\lambda_1$ injected into the fiber at x=o, and f is the fractional solid angle that the fiber core subtends. Loss in the fiber is not included in these equations.

To determine the conversion efficiency of this process we solve equations 1-3 to obtain a relationship between the converted flux $I_2(x)$ and the input flux $I_{10}$.

$$\eta(I_{10}\tau_2\alpha_2)(1 - \exp(-N_0\alpha_1 x)) = (I_2(x) - I_{20})\tau_2\alpha_2 + (1-f)\ln\frac{I_2(x)\tau_2\alpha_2 + f}{I_{20}\tau_2\alpha_2 + f} \qquad (4)$$

where $I_{20}$ is the input flux at the lasing wavelength. A small amount of flux injected at $\lambda_2$ ($I_{20}$) can significantly decrease the amount of pump power required for a given conversion efficiency. We note that in equation (4) all fluxes $I_{10}$, $I_1$, $I_{20}$ are multiplied by $\tau_2\alpha_2$, indicating that $I_c = 1/\tau_2\alpha_2$ is a natural unit for measuring photon flux in this problem. Physically, $I_c$ represents the minimum input flux required at the pump wavelength for stimulated emission to dominate the conversion process in the fiber. Equation (4) can then be rewritten in terms of dimensionless powers resulting in the following equation:

$$\eta P_{10} = P_2 - P_{20} + (1-f)\ln\frac{P_2 + f}{P_{20} + f} \qquad (5)$$

where $P_{10}=I_{10}/I_c$, $P_{20}=I_{20}/I_c$, $P_2=I_2/I_c$ and the limit ($x\to\infty$) has been taken to estimate the conversion frequency.

A reasonable value for f for a single mode fiber is $1.9\times10^3(=f_o)$, this corresponds to the fiber subtending a ten degree angle (full width). In FIG. 4, equation 5 is plotted. The normalized converted power, $P_2$ is plotted as a function of the normalized input power $\eta P_{10}$ for various values of $P_{20}$ and f. The intersection of the straight line 61 with these curves indicates the input power, $\eta P_{10}$ where 3 dB conversion efficiently occurs. With no injected power at $\lambda_2$ ($P_{20}=0$), $\eta P_{10}$ at 3 db is about 16.5 for $f=f_o$ and $\eta P_{10}$ at 3 db is about 14.5 for $f=2f_o$ indicating that the calculation is not sensitive to the exact value of f. However when a small amount of light at $\lambda_2$ is injected such that $P_{20}=0.1$, $\eta P_{10}$ at 3 db is less than 8 (for $f_o=f_o$), resulting in a nearly 3 dB decrease of the necessary input pump power. This indicates that injection of an "idler" beam at $\lambda_2$ may be a convenient way to decrease the necessary input pump power.

To convert the normalized powers from FIG. 4 to milliwatts we need $\tau_2\alpha_2$ which can be expressed in terms of the following equation:

$$\tau_2 \alpha_2 = \frac{\lambda_2^2}{8\pi n^2 \Delta v} \quad (6)$$

where $\Delta v$ is the linewidth of the gain in sec$^{-1}$ and n is the index of refraction of the medium. For Nd$^{+3}$-doped silica fiber $\Delta v = 200$ cm$^{-1}$ which yields $$I_c = \frac{1}{\alpha_2 \tau_2} = 3.39 \times 10^{22} \frac{1}{cm^2 sec}.$$

In a 9 μm diameter fiber at a pump wavelength of 0.8μ, this represents a power of $P_c = 5.36$ mW. The appropriate value for the absorption quantum efficiency ($\eta$) is about 0.4. The values of $P_{10}$ at 3 db discussed in the last paragraph can now be translated into mW. When no idler beam is present at $\lambda_2$, $P_{10}$ at 3 db is equal to 225 mw which can be lowered to 100 mw by injecting an idler with power of about 0.5 mw.

Although a specific embodiment has been described numerous other devices can be used to implement the directional coupler and frequency shifting functions required in the optical fiber tap. For example, other forms of wavelength selective couplers can be utilized and the frequency shifting function can be provided by mode conversion in a birefringent crystal, for example lithium niobate. See, for example, the article entitled "Integrated-optical frequency translator with stripe waveguide," *Applied Physics Letters*, 45 (5), 1 Sept. 1984, by F. Heismann and R. Ulrich. The mode conversion devices of the type described in the latter article require periodic electrodes and therefore are inherently wavelength selective. Accordingly, they can be constructed such that they are effective in shifting the frequency in the band of their effectiveness while leaving frequencies that are out of the band unchanged.

What is claimed is:

1. An optical communication system comprising a bus comprising at least two fiber taps,
    said fiber taps comprising,
    a. first input and first output means adapted for connecting said at least two optical fiber taps in series
    b. a second input means for receiving light from an optical transmitter, and
    c. a second output means for delivering light to an optical receiver
    the invention characterized in that
    said optical fiber tap includes
    a single mode coupler means having first and second input ports and first and second output ports for cross-coupling light having a first characteristic with high efficiency and for cross-coupling light having a second characteristic with lower efficiency,
    said first and second input ports being connected to said first and second input means respectively, said second output port being connected to said second output means, and
    single mode conversion means for converting light having said first characteristic to light having said second characteristic while passing virtually unchanged light having said second characteristic,
    said single mode conversion means being connected to receive light from said first output port and to provide to said first output means, and
    means, connected to said second input means, for varying said light of said first characteristic in a manner representative of intelligence.

2. An optical communication system comprising a bus comprising, at least two fiber taps, said fiber taps, comprising
    a. first input adapted to receive light from an optical fiber bus to which said at least two fiber taps are connected,
    b. a second input adapted to receive light from an optical transmitter,
    c. a first output adapted to provide light to an optical fiber bus, and a second output adapted to couple light to an optical receiver,
    said at least one optical fiber tap comprising
    single mode coupler means having first and second input ports and first and second output ports for cross-coupling light having a first characteristic with high efficiency and for cross-coupling light having a second characteristic with lower efficiency,
    said first and second input ports and said second output port of said single mode coupler means being connected so as to serve as the first and second input and second output respectively of said optical fiber tap, and
    single mode conversion means having an input port and an output port for converting light having said first characteristic to light having said second characteristic while passing virtually unchanged light having said second characteristic,
    said single mode conversion means having its input port connected to receive light from said first output port of said single mode coupler means,
    the output port of said conversion means being connected to serve as the first output of said optical fiber tap, and
    means, connected to said second input means, for varying said light of said first characteristic in a manner representative of intelligence.

3. The optical communication system of claim 1 or 2 wherein said first and second characteristics are different wavelengths, said single mode coupler means is constructed to cross-couple light having a first wavelength with high efficiency and to cross-couple light having a second wavelength with lower efficiency, and said single mode conversion means is constructed to convert light having said first wavelength to light having said second wavelength while processing light having said second wavelength with virtually no change.

4. The optical communication system of claim 3 wherein said single mode coupler means comprises a polished directional coupler having two single mode fibers that are rigidly affixed to be proximate to each other for a length that provides evanescent coupling between the fibers.

5. The optical communication system of claim 4 wherein said single mode conversion means comprises a neodyminum-doped silica fiber.

6. The optical fiber communication system of claim 1 or 2 wherein said single mode converter comprises a birefringent crystal.

7. The optical fiber communication system of claim 6 wherein said birefringent crystal is lithium niobate.

8. The optical communication system of claims 1 or 2 further comprising an idler beam, resident on said bus, having said first characteristic.

* * * * *